United States Patent
Ben-Yehuda et al.

(10) Patent No.: US 8,312,433 B2
(45) Date of Patent: Nov. 13, 2012

(54) OPERATING SYSTEM AIDED CODE COVERAGE

(75) Inventors: Shmuel Ben-Yehuda, Haifa (IL); Moshe Klausner, Ramat Yishay (IL)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 12/334,688

(22) Filed: Dec. 15, 2008

(65) Prior Publication Data

US 2010/0153926 A1   Jun. 17, 2010

(51) Int. Cl.
*G06F 9/44* (2006.01)

(52) U.S. Cl. .......................... 717/127; 712/228

(58) Field of Classification Search .................... 717/127
See application file for complete search history.

(56) References Cited

U.S. PATENT DOCUMENTS

| | | | |
|---|---|---|---|
| 6,282,701 B1 | 8/2001 | Wygodny et al. | |
| 6,314,471 B1 | 11/2001 | Alverson et al. | |
| 6,314,530 B1* | 11/2001 | Mann | 714/38.11 |
| 6,560,626 B1* | 5/2003 | Hogle et al. | 718/102 |
| 7,299,319 B2 | 11/2007 | Dimpsey et al. | |
| 7,373,637 B2 | 5/2008 | DeWitt, Jr. et al. | |
| 7,392,370 B2* | 6/2008 | DeWitt et al. | 712/227 |
| 2003/0233392 A1* | 12/2003 | Forin et al. | 709/107 |
| 2004/0025093 A1 | 2/2004 | Willy et al. | |
| 2004/0160446 A1* | 8/2004 | Gosalia et al. | 345/503 |
| 2005/0071819 A1* | 3/2005 | Calyanakoti et al. | 717/128 |
| 2005/0165976 A1* | 7/2005 | Bittner et al. | 710/1 |
| 2005/0210452 A1* | 9/2005 | Dimpsey et al. | 717/120 |
| 2006/0200663 A1* | 9/2006 | Thornton | 713/164 |
| 2007/0157178 A1* | 7/2007 | Kogan et al. | 717/130 |
| 2007/0260859 A1* | 11/2007 | Chen et al. | 712/227 |
| 2007/0261033 A1* | 11/2007 | Chen et al. | 717/130 |
| 2008/0040551 A1* | 2/2008 | Gray et al. | 711/130 |
| 2008/0183944 A1* | 7/2008 | Thornton et al. | 711/6 |
| 2008/0320475 A1* | 12/2008 | Klein et al. | 718/100 |
| 2010/0083275 A1* | 4/2010 | Jayamohan et al. | 718/108 |

FOREIGN PATENT DOCUMENTS

| | | |
|---|---|---|
| JP | 5282177 | 10/1993 |
| KR | 2007087400 A | 8/2007 |

OTHER PUBLICATIONS

Alex Shye, et al., Code Coverage Testing Using Hardware Performance Monitoring Support, AADEBUG '05, Sep. 19-21, 2005, Copyright 2005, pp. 159-163.

* cited by examiner

*Primary Examiner* — Don Wong
*Assistant Examiner* — Theodore Hebert
(74) *Attorney, Agent, or Firm* — Cantor Colburn LLP; Yoav Alkalay

(57) ABSTRACT

A method, system, and computer program product for operating system (OS) aided code coverage are provided. The method includes reading context information associated with a software process in response to a context switching event in an OS, the OS initiating the reading of the context information and controlling scheduling of the software process. The method further includes determining coverage information for code implementing the software process as a function of the context information in response to the OS reading the context information, and storing the coverage information as coverage data.

20 Claims, 5 Drawing Sheets

OPERATING SYSTEM AIDED CODE COVERAGE

BACKGROUND

The present invention relates to software verification, and more specifically, to operating system aided code coverage.

Code coverage is a measure used in software testing, describing the degree to which source code of an application program has been exercised. Code coverage may quantify what portions of the application program were executed by a given test or series of tests. Collection of code coverage data is typically performed through directly instrumenting the application by adding additional code to monitor application parameters during execution. While running the instrumented application program (or at its termination) typically a coverage file is created. This approach also introduces overhead to the application execution due to the additional instrumentation code. Additional application-level support for a file system may also be required to store coverage information. For example, the application under test may be modified to write data gathered via instrumentation, injecting further changes into the application.

Instrumenting an application may not be effective or feasible for a number of scenarios, such as performing coverage at system level tests, in real-time applications, or where storage is inaccessible to the application for logging coverage information. System level tests may not support modification to add instrumentation, since the application is configured as it will be received by the customer (e.g., final release version) which makes modifying the application for instrumentation unacceptable. In a real-time application, the additional overhead associated with instrumentation may place too great of an additional burden on the system to maintain timing and memory allocation constraints for the application.

A less intrusive technique may employ sampling of hardware performance counters using special performance monitoring hardware to detect which part of the code was executed. Sampling hardware performance counters, however, is not always available, especially in embedded systems. Hardware performance counters add to the complexity and expense of processing system hardware, and may introduce new hardware failure modes should the performance monitoring hardware fail. Moreover, sampling of hardware performance counters introduces additional overhead and intervenes in normal execution of the program since the sampling is typically monitored by special kernel or user space application.

SUMMARY

According to one embodiment of the present invention, a method for operating system (OS) aided code coverage is provided. The method includes reading context information associated with a software process in response to a context switching event in an OS, the OS initiating the reading of the context information and controlling scheduling of the software process. The method further includes determining coverage information for code implementing the software process as a function of the context information in response to the OS reading the context information, and storing the coverage information as coverage data.

A further embodiment is a system for OS aided code coverage. The system includes system memory and a processing unit coupled to the system memory. The processing unit executes an OS that includes scheduling logic to control scheduling of a software process, context switch logic to read context information associated with the software process in response to a context switching event, and coverage logic to determine coverage information for code implementing the software process as a function of the context information read by the context switch logic, and storing the coverage information as coverage data to the system memory.

Another embodiment is embodiment is a computer program product for OS aided code coverage. The computer program product includes a storage medium readable by a processing unit and storing instructions for execution by the processing unit for implementing a method. The method includes reading context information associated with a software process in response to a context switching event in an OS, the OS initiating the reading of the context information and controlling scheduling of the software process, where the software process is an executable instance of an application program. The method further includes determining coverage information for code implementing the software process as a function of the context information in response to the OS reading the context information, and storing the coverage information as coverage data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
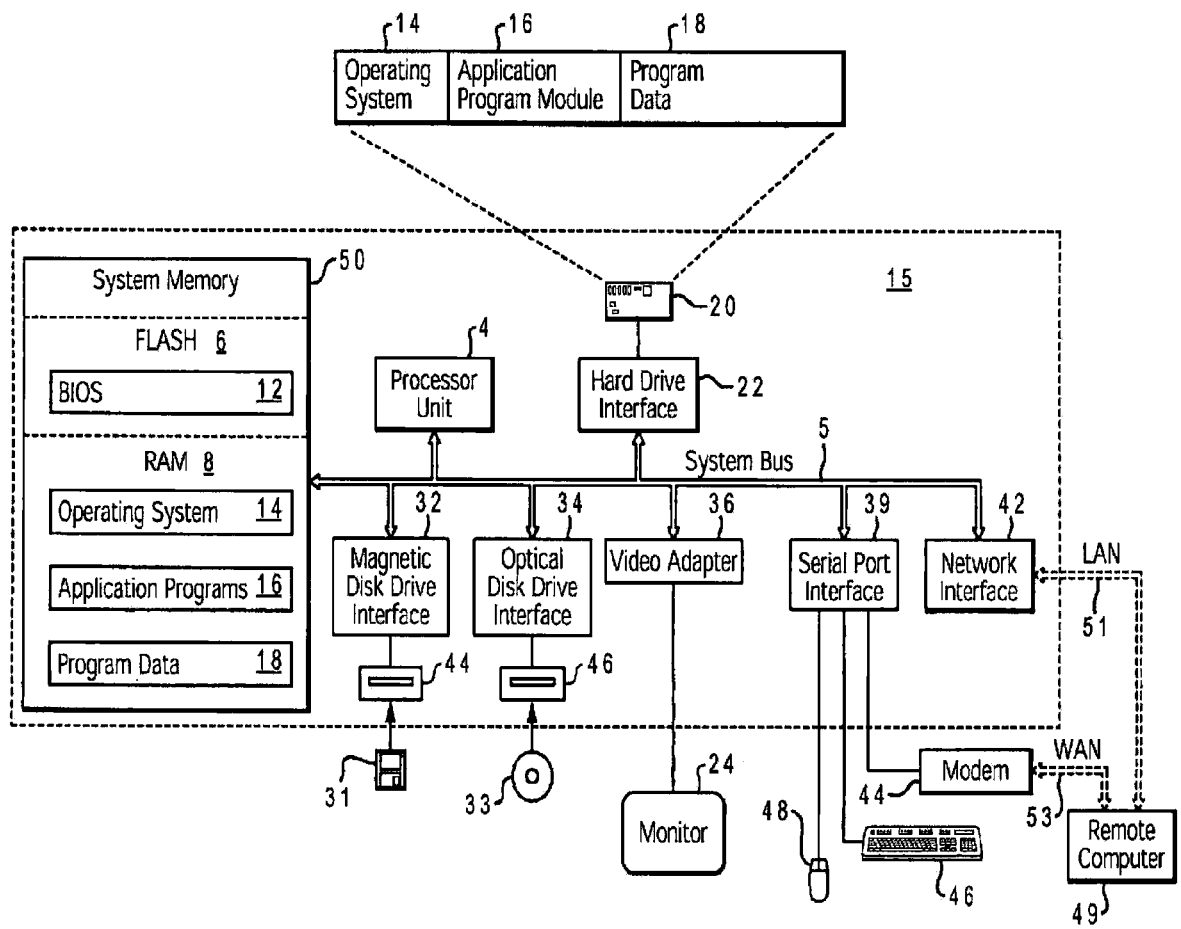
FIG. 1 depicts block diagram illustrating an exemplary computer system that may be utilized to implement exemplary embodiments of the present invention.

The invention as described herein provides operating system aided code coverage. Using an operating system (OS), applications may be run and managed as processes, tasks, threads, or the like, which are collectively referred to as "processes" herein. The OS schedules the processes in and out for execution on shared processing circuitry, e.g., a CPU. In order to pause execution of one process, switch to another process, and later resume execution of the first process, context information is stored by the OS prior to switching from the first process to the second process, enabling the first process to resume execution as if it had run without interruption. This is referred to as a "context switch". During the context switch, the OS may save the complete state of the process, including states of various registers, such as a program counter (PC), stack pointer, condition codes, general purpose registers, floating-point registers, address registers, status registers, memory management information, and the like. In an exemplary embodiment, coverage logic is added to the OS to access the context information captured during context switching. This information can be used to log coverage information of the applications associated with the processes. In addition to application state information captured directly as part of the context, the OS can also check other system parameters and associate them with the current state of the application execution to log various inter-application state data.

The coverage logic of the OS can perform coverage data collection on single thread and multi-thread applications, e.g., where one process or multiple processes represent execution instances of a single application. Additionally, coverage can be achieved across multiple applications running simultaneously under the control of the OS. In an exemplary embodiment, the OS supports pseudo-context switching. Pseudo-context switching refers to scheduling one or more processes for context examination without performing an actual context switch. This enables context information to be examined at a higher rate than the rate of process switching. The OS can perform a pseudo-context switch just for coverage purposes. That is, scheduling the process and examining the PC or another relevant portion of the context without saving it and resuming execution of the process without switching to another process. Thus, in exemplary embodiments, existing OS logic is leveraged and expanded upon to monitor applications without modifying the applications and without adding monitoring hardware.

The coverage logic in the OS can aid in testing code through logging data to determine various types of coverage. For example, the coverage logic can log PC information over a period of time as coverage data, which can then be post processed to compare the log of PC information against a symbol table or map file for the application to determine specific sections of code that were being executed when the context was captured. This information may indicate execution of specific functions, lines of sources code, paths, branches, entry, and exit of the functions in the application, providing coverage information. Additional coverage information can be derived from the context information, as well as other resources available to the OS. For instance, the coverage logic can determine stack usage, heap usage, queue usage, and other memory usage information based checking allocation request parameters against registers containing pointer values (e.g., the stack pointer) to determine how much of the resources have been consumed. The OS may use other resource tracking techniques known in the art to determine resource consumption at context switching time. Further details regarding operating system aided code coverage are provided herein.

FIG. 1 and the following discussion are intended to provide a general description of an exemplary data processing system that can be adapted to implement exemplary embodiments of the present invention. While exemplary embodiments of the present invention will be described in the general context of an operating system that runs application programs in conjunction with a personal computer, those skilled in the art will recognize that exemplary embodiments may also be implemented in combination with other program modules such as, for example, platform software modules, user-written software modules (such as spreadsheet templates, word processor macros, graphics scripts, etc.), routines, programs, components, data structures, etc. that perform particular tasks or implement particular abstract data types. Moreover, those skilled in the art will appreciate that exemplary embodiments of the present invention may be practiced with other computer system configurations, including hand-held devices, multi-processor systems, microprocessor-based or programmable consumer electronics, minicomputers, mainframe computers, and the like, as well as in distributed computing environments where tasks are performed by remote processing devices that are linked through a communications network. In a distributed computing environment, program modules may be located in both local and remote memory storage devices.

Referring now to FIG. 1, there is depicted an exemplary data processing system 15 that may be utilized to implement exemplary embodiments of the present invention. For discussion purposes, the data processing system 15 is described as having features common to a personal computer, such as a desktop or portable computer. As used herein, however, the terms "data processing system," "computer," and the like, are intended to mean essentially any type of computing device or machine that is capable of receiving, storing, and running a software product, including such devices as communication devices (for example, pagers, telephones, electronic books, electronic magazines and newspapers, etc.) and personal and home consumer devices (for example, handheld computers, Web-enabled televisions, home automation systems, multimedia viewing systems, gaming consoles, etc.).

Data processing system 15, as provided in FIG. 1, is configured as a personal computer that generally includes a processing unit 4, a system memory 50, and a system bus 5 that couples system memory 50 to processing unit 4. The system memory 50 may include read-only memory, such as flash memory 6, as well as volatile read-write memory, such as random access memory (RAM) 8. Flash memory 6 is an electrically erasable programmable read only memory (EEPROM) module that includes a basic input/output system (BIOS) 12. The BIOS 12 contains the basic routines that facilitate transfer of information between elements within the data processing system 15, such as during start-up.

Data processing system 15 may further include a hard disk drive 20, a magnetic disk drive 44 (which can be used to read from or write to a removable disk 31), and an optical disk drive 46 (which can be used to read a CD-ROM disk 33 or read or write to other optical media). Hard disk drive 20, magnetic disk drive 44, and optical disk drive 46 are communicatively coupled to system bus 5 by a hard disk drive interface 22, a magnetic disk drive interface 32, and an optical disk drive interface 34, respectively. The drives and their associated computer-readable media provide nonvolatile storage for data processing system 15. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments.

A number of program modules may be stored in the drives 20, 44, 46, and RAM 8, including an operating system (OS) 14, application program modules 16 (such as, for example, word processors, development applications, data management applications, and Web applications), and program data 18. A user may enter commands and information into data processing system 15 through a keyboard 46 and a mouse 48. Other input devices (not shown) may include, for example, a microphone, joystick, game pad, satellite dish, scanner, or the like. These and other input devices may be connected to processing unit 4 through a serial port interface 39 that is coupled to system bus 5, but may be connected by other interfaces, such as a game port or a universal serial bus (USB).

A monitor 24 or other type of display device is also connected to system bus 5 via an interface, such as a video adapter 36. In addition to the monitor, the exemplary computer operating environment may also include other peripheral output devices (not shown), such as speakers or printers. Although only a single system bus 5 and processing unit 4 are depicted, it will be understood that other bus architectures are also included within the scope of the invention, such as multiple buses, multiple processors, and multi-core modules.

Data processing system 15 may operate in a networked environment using logical connections to one or more remote computers, such as a remote computer 49. Remote computer 49 may be, for example, a server, a router, a peer device, or another common network node, and may include many or all of the elements described in relation to data processing system 15. The logical connections depicted in FIG. 1 include a local area network (LAN) 51 and a wide area network (WAN) 53.

When used in a LAN networking environment, data processing system 15 is connected to LAN 51 through a network interface 42. When used in a WAN networking environment, data processing system 15 may include a modem 44 or other means for establishing communications over WAN 53, such as the Internet. Modem 44, which may be internal or external to data processing system 15, may be connected to system bus 5 via serial port interface 39. In a networked environment, program modules depicted relative to data processing system 15, or portions thereof, may be stored in the remote memory storage device. It will be appreciated that the network connections shown are exemplary and other means of establishing a communications link between the computers may be used. For instance, networking can be achieved via wired, wireless, and/or optical communication interfaces.

Figure 2:
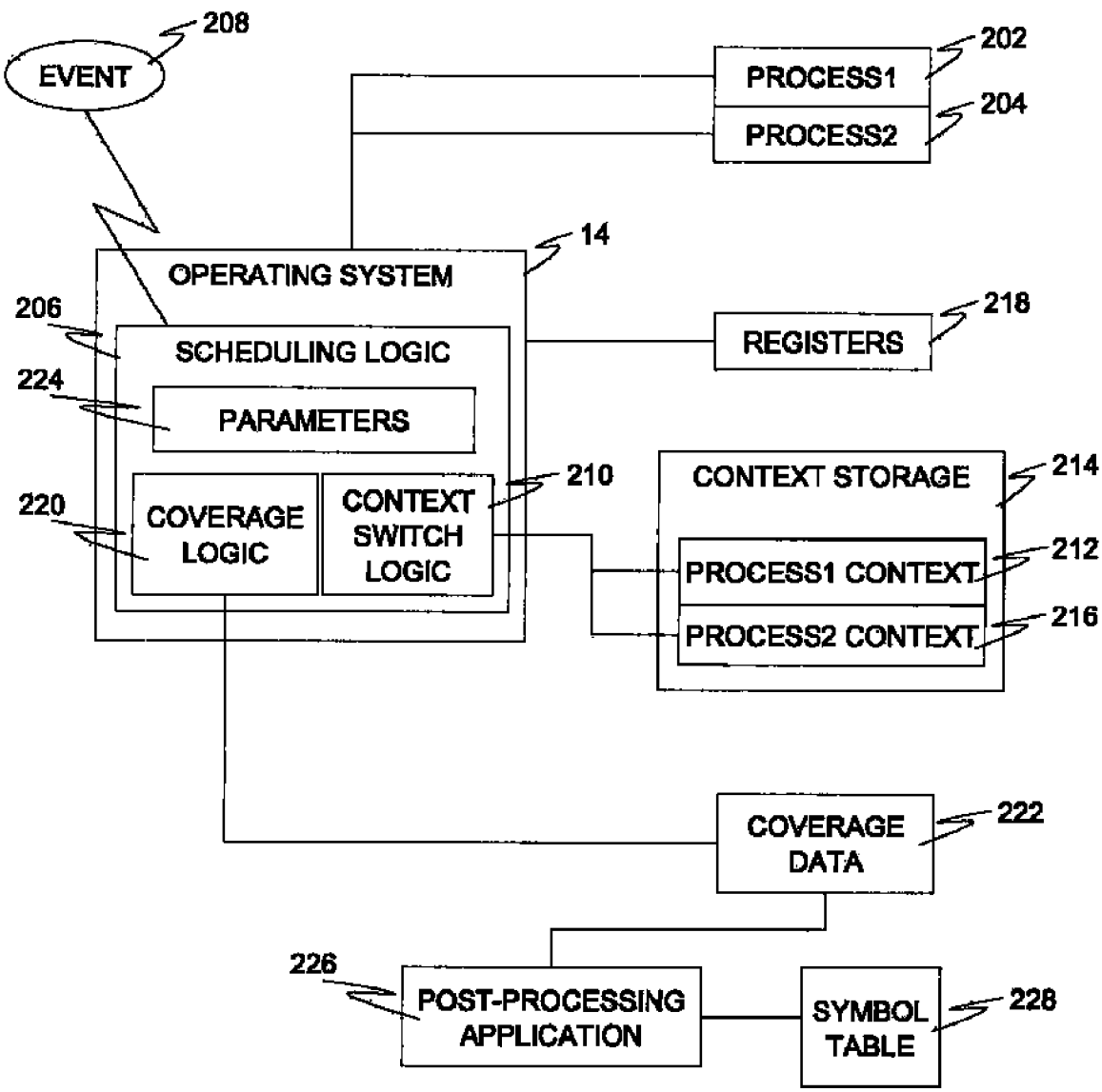
FIG. 2 depicts an example of coverage logic as part of operating system context switching in a multiple process environment in accordance with exemplary embodiments.

Turning now to FIG. 2, further details of the OS 14 of FIG. 1 are depicted for an exemplary multi-process environment. In the example depicted in FIG. 2, the OS 14 interfaces with process1 202 and process2 204, which represent instances of one or more of the application programs 16 of FIG. 1. For instance, processes 202 and 204 can represent a common application launched multiple times or entirely separate applications. The OS 14 uses scheduling logic 206 to determine when the processes 202 and 204 should be executed or otherwise interrupted. The scheduling logic 206 may respond to an event 208 such as an interrupt or a system call. Alternatively, the scheduling logic 206 may include timing functions to trigger an internal event and determine when to switch between or interrupt the processes 202 and 204. The scheduling logic 206 can trigger context switch logic 210 to store and restore context information for the processes 202 and 204. For example, upon determining that it is time to switch between executing process1 202 and process2 204, the context switch logic 210 stores process1 context 212 into context storage 214 and reads process2 context 216 from the context storage 214, assuming that process2 context 216 was previously stored to the context storage 214. The process2 context 216 values are restored, which enables execution of process2 204 as if it had not been interrupted to run process1 202. The values read from and written to process1 context 212 and process2 context 216 include state information, such values of registers 218, which may include a PC, stack pointer, condition codes, general purpose registers, floating-point registers, address registers, status registers, memory management information, and the like.

In an exemplary embodiment, the OS 14 utilizes coverage logic 220 to read context information and determine coverage information for code implementing the processes 202 and 204 as a function of the context information. This assists in code coverage data collection, which may be helpful during development or post-development test activities. The coverage logic 220 can access stored context information in the context storage 214 or access the context information gathered by the context switch logic 210. For example, collecting snapshots of the PC on each context switching event indicates which locations in the application associated with process1 202 or process2 204 was being executed prior to the context switching event, e.g., event 208. The coverage information is stored as coverage data 222, which may be held temporarily in RAM 8 or be written to one of the drives 20, 44, and/or 46 of FIG. 1. The full context of the processes 202 and 204 need not be saved or examined completely by the coverage logic 220 for the coverage logic 220 to function.

Parameters 224 can also be examined for coverage information. The parameters 224 may include inter-process state data, for instance, data that is common across processes 202 and 204. The coverage logic 220 associates the parameters 224 with the context information to determine the coverage information. The parameters 224 may also include one or more threshold limits to perform a coverage task. For example, a coverage task could be that process1 202 does not reach 70% of stack usage at any time during execution. Comparing the stack usage against the threshold limit at each invocation of the coverage logic 220 enables the coverage logic 220 to determine whether the threshold limit was exceeded, as well as capture a snapshot of other context data when the threshold is exceeded. The resulting data can be stored in the coverage data 222. The parameters 224 may also indicate a desired coverage level and whether the coverage logic 220 should be enabled/disabled under various conditions. Enabling and disabling of the coverage logic 220 can be driven using supervisor commands, a configuration file, or automatically based on system loading (e.g., percentage utilization of the processing unit 4 of FIG. 1).

In an exemplary embodiment, a post-processing application 226 can be used to further analyze the coverage data 222. The post-processing application 226 may be one of the application programs 16 of FIG. 1. For instance, if the coverage data 222 includes PC values, the post processing application 226 can look up address values in a symbol table 228 that maps locations to specific functions and/or portions of code to determine which specific sections of code were executed. The symbol table 228 may be a kind of program data 18 of FIG. 1. While only one symbol table 228 is depicted in FIG. 2, it will be understood that multiple symbol tables or similar mapping files can be used to map the coverage data 222 to source code associated with processes 202 and/or 204.

Figure 3:
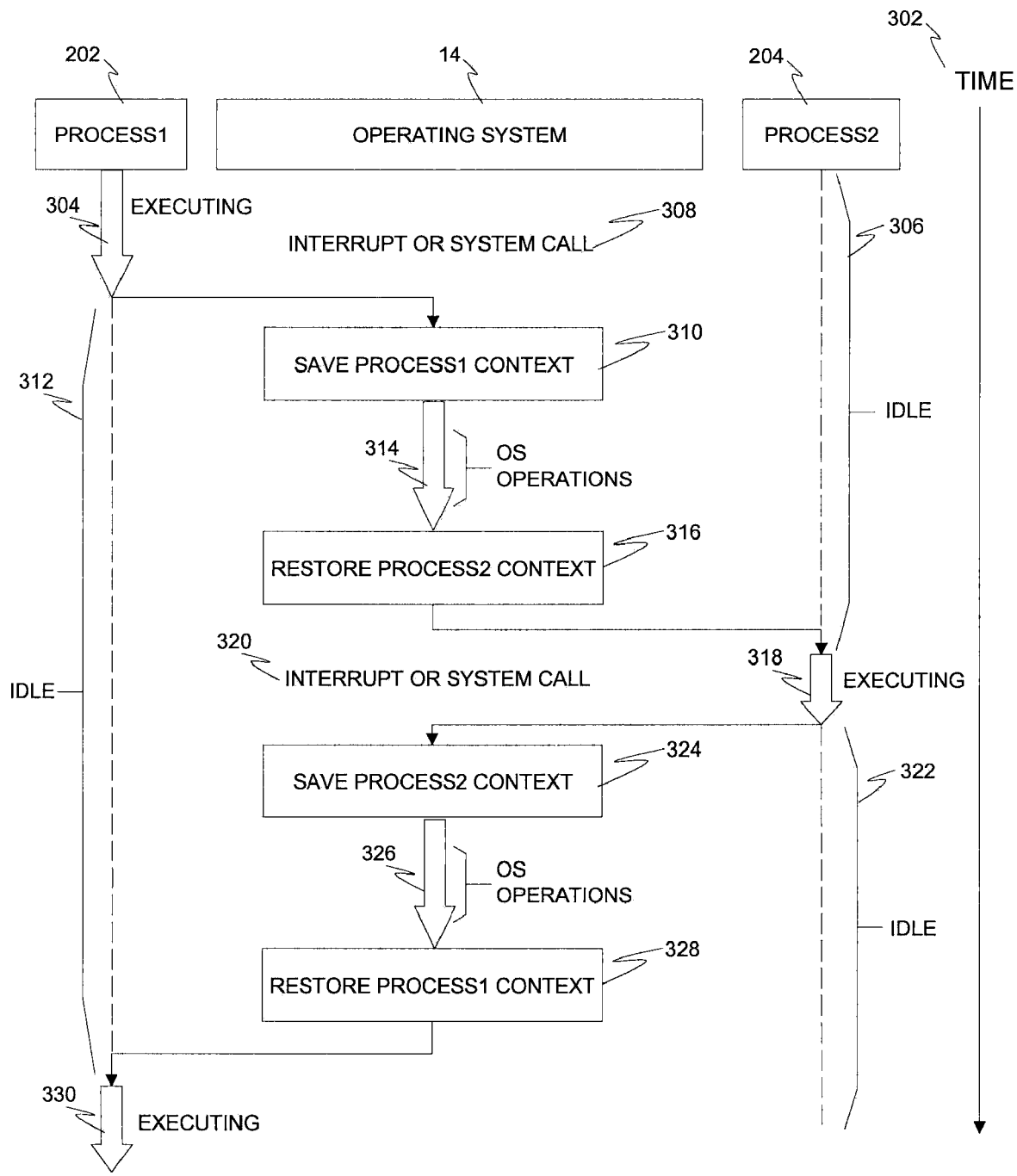
FIG. 3 depicts a process switching diagram in accordance with exemplary embodiments.

FIG. 3 depicts a process switching diagram in accordance with exemplary embodiments. Arrow 302 illustrates the progression of time from the top towards the bottom of FIG. 3. Initially in this example, process1 202 is executing 304 and process2 204 is idle 306. An interrupt or system call 308, such as event 208, triggers scheduling logic 206 of FIG. 2. The scheduling logic 206 may determine that it should switch between executing process1 202 and process2 204 in response to the interrupt or system call 308. The scheduling logic 206 can trigger a context switching event and utilize the context switch logic 210 of FIG. 2 to pause process1 202 and save process1 context 212 to the context storage 214 of FIG. 2, as depicted in block 310. This makes process1 202 transition to idle 312 and process2 204 also remains idle 306 as the OS 14 performs OS operations 314. The OS operations 314 may include running the coverage logic 220 to examine the process1 context 212 to determine coverage information. After the coverage information is saved as coverage data 222 and any additional OS operations 314 are performed, the context switch logic 210 restores process2 context 216 for process2 204 as depicted in block 316. Process2 204 switches to executing 318 and process1 202 remains idle 312.

In response to another interrupt or system call 320, such as event 208, the scheduling logic 206 of FIG. 2 is triggered again. The scheduling logic 206 determines that it should switch between executing process2 204 and process1 202 in response to the interrupt or system call 320. The scheduling logic 206 triggers a context switching event and utilizes the context switch logic 210 of FIG. 2 to pause process2 204 and save process2 context 216 to the context storage 214 of FIG. 2, as depicted in block 324. This makes process2 204 transition to idle 322 and process1 202 also remains idle 312 as the OS 14 performs OS operations 326. The OS operations 326 may include running the coverage logic 220 to examine the process2 context 216 to determine coverage information. After the coverage information is saved as coverage data 222 and any additional OS operations 326 are performed, the context switch logic 210 restores process1 context 212 for process1 202 as depicted in block 328. Process1 202 switches to executing 330 and process2 204 remains idle 322. The sequence can be repeated until one or both of the processes 202 and 204 terminate.

Figure 4:
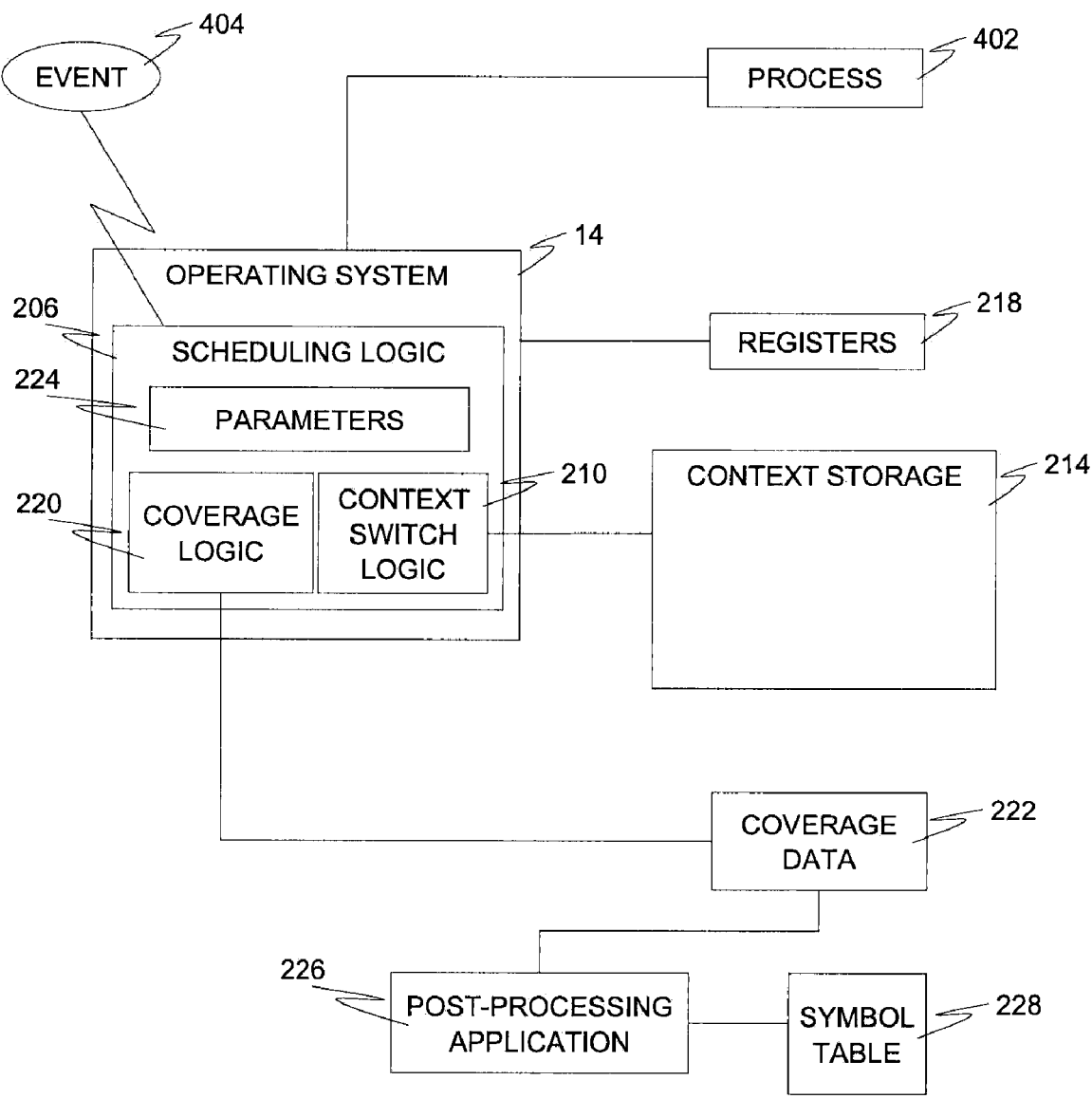
FIG. 4 depicts an example of coverage logic as part of operating system pseudo-context switching in a single process environment.

FIG. 4 depicts an example of coverage logic 220 as part of pseudo-context switching in a single process environment. FIG. 4 includes elements as previously described in reference to FIGS. 1-3. For example, FIG. 4 includes the OS 14 with scheduling logic 206, context switch logic 210, coverage logic 220 and parameters 224. The OS 14 can access registers 218 and context storage 214. Coverage information as determined by the coverage logic 220 is stored as coverage data 222, which may be accessible to the post-processing application 226 in conjunction with the symbol table 228. FIG. 4 illustrates an example of a single process 402 executing under control of the OS 14. Since there is only the single process 402, actual context switching need not be performed by the context switch logic 210. In response to an event 404, the scheduling logic 206 can pause execution of the process 402 and trigger the context switch logic 210 to perform pseudo-context switching. Pseudo-context switching makes context information available but avoids storing the context information to the context storage 214. Context information may be available to the coverage logic 220 in the form of a data object in RAM 8 of FIG. 1, or it can be directly accessible via the registers 218 and/or the parameters 224. Thus, the coverage logic 220 is able to operate in a similar fashion as described in reference to FIGS. 2 and 3 to determine coverage information for the process 402.

Although pseudo-context switching has been described in reference to a single process 402, it will be understood that pseudo-context switching can be applied to a multiple process environment, such as that depicted in FIGS. 2 and 3. For example, the event 208 that triggers a switch between processes 202 and 204 may occur at a relatively slow rate. The OS 14 can also be sensitive to other types of events, such as event 404, that can occur at a higher rate to increase the frequency of coverage information collection without unnecessarily saving and switching context on each type of event.

Figure 5:
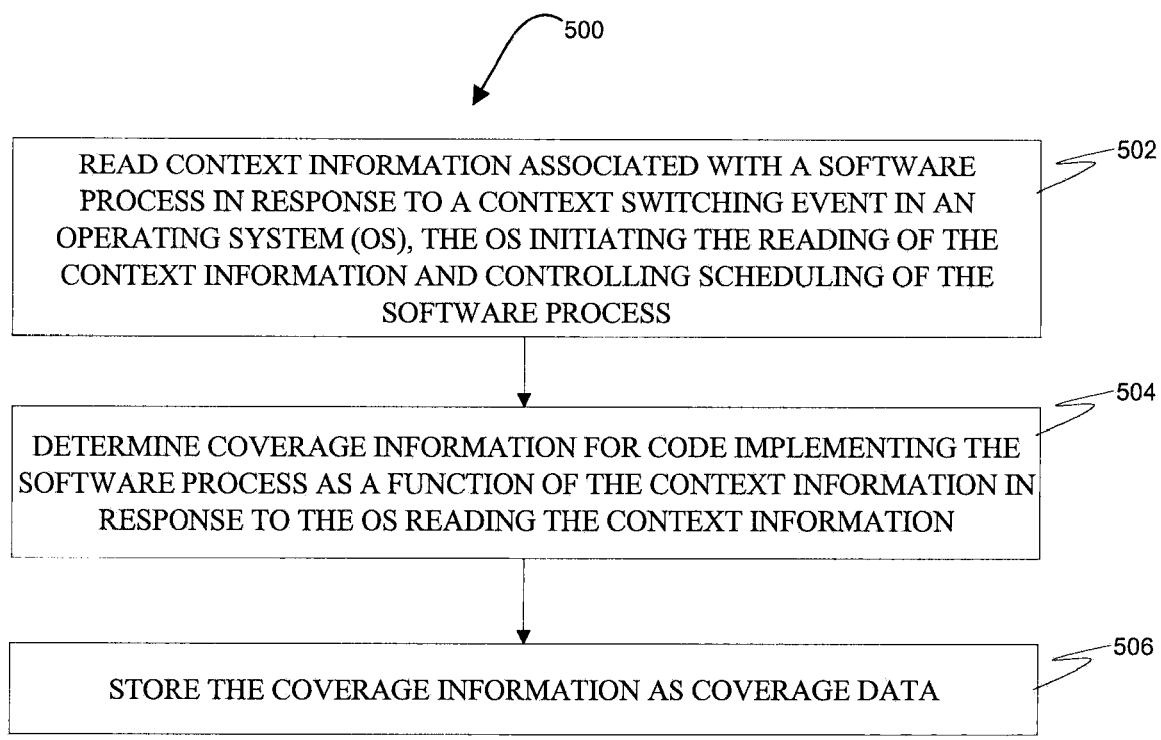
FIG. 5 depicts an exemplary process for operating system aided code coverage.

Turning now to FIG. 5, a process 500 for operating system aided code coverage will now be described in accordance with exemplary embodiments, and in reference to FIGS. 1-4. At block 502, context switch logic 210 reads context information associated with a software process (e.g., processes 202, 204 or 402) in response to a context switching event. The OS 14 initiates the reading of the context information and controls scheduling of the software process, for instance, using the scheduling logic 206 in conjunction with the context switch logic 210. The context switch logic 210 can pause execution of the software process in response to a scheduling event (e.g., event 208 or 404) received at the scheduling logic 206. The context switching event may be triggered in response to pausing the execution of the software process. The context switch logic 210 may store the context information associated with the software process in response to the context switching event. The context switching event may be an actual context switch or a pseudo-context switch, where the pseudo-context switch performs the determination of coverage information and resumes execution of the software process without switching to a second software process.

At block 504, the coverage logic 220 determines coverage information for code implementing the software process as a function of the context information in response to the OS 14 reading the context information. The context information associated with the software process can include one or more state values of one or more of the registers 218, including one of more of a program counter, a stack pointer, condition codes, general purpose registers, floating-point registers, address registers, status registers, and memory management information. The parameters 224 accessible to the OS 14, including inter-process state data, can be checked and associated with the context information to determine the coverage information. Additionally, the coverage logic 220 can perform coverage tasks, such as reading the parameters 224 to establish one or more threshold limits and comparing the context information against the one or more threshold limits.

At block 506, the coverage logic 220 stores the coverage information as coverage data 222. The context switch logic 210 may restore previously stored context information associated with a second software process (e.g., process2 204) and resume execution of the second software process subsequent to storing the coverage information. Performance of the determining and storing of the coverage information may be configurable. The post-processing application 226 can perform post-processing of the coverage data 222 with respect to symbol table 228 to identify portions of the code that were executed, as well as output other coverage analysis results.

Technical effects include collecting code coverage data collection data at the OS level using data associated with context switching. This supports software development verification without modifying the application under test or requiring special purpose monitoring hardware. Piggy backing on existing context switching, which is already performed by the OS, enables code coverage without extra overhead. Applying coverage logic at the OS level also allows coverage analysis in a post-development environment, such as at a customer site. OS level code coverage data collection may be safer than at the application level, since more resources are available and accessible. This avoids potential errors that can occur at the application level, such as writing to a file without proper permission or attempting to write to a file that does not exist. The coverage logic of the OS may be turned on/off of by supervisor commands, for example, changing a process running level from at coverage level to regular level and vise versa. This can be done automatically based on system load.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium (which can also be writeable) may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
reading context information associated with a software process in response to a context switching event in an operating system (OS), the OS initiating the reading of the context information and controlling scheduling of the software process;
determining, using the context information, coverage information for code implementing the software process in response to the OS reading the context information; and
storing the coverage information as coverage data.

2. The method of claim 1 wherein the software process is an executable instance of an application program, and performance of the determining and storing of the coverage information is configurable.

3. The method of claim 1 further comprising:
pausing execution of the software process in response to a scheduling event received at scheduling logic of the OS;
storing the context information associated with the software process in response to the context switching event;
triggering the context switching event in response to pausing the execution of the software process;
restoring previously stored context information associated with a second software process; and
resuming execution of the second software process subsequent to storing the coverage information.

4. The method of claim 1 wherein the context switching event is a pseudo-context switch performing the determination of coverage information and resuming execution of the software process without switching to a second software process.

5. The method of claim 1 wherein the context information associated with the software process includes one or more state values of one or more registers.

6. The method of claim 5 wherein the one or more registers includes one of more of: a program counter, a stack pointer, condition codes, general purpose registers, floating-point registers, address registers, status registers, and memory management information.

7. The method of claim 1 further comprising:
checking parameters accessible to the OS, including inter-process state data; and
associating the parameters with the context information to determine the coverage information.

8. The method of claim 1 further comprising:
performing a coverage task in the OS, comprising:
reading parameters to establish one or more threshold limits to perform a coverage task in the OS;
comparing the context information against the one or more threshold limits; and
storing a result of the comparing to the coverage data.

9. A system comprising:
system memory; and
a processing unit coupled to the system memory, the processing unit executing an operating system (OS), the OS comprising:
scheduling logic to control scheduling of a software process;
context switch logic to read context information associated with the software process in response to a context switching event; and
coverage logic to determine, using the context information, coverage information for code implementing the software process, and storing the coverage information as coverage data to the system memory.

10. The system of claim 9 wherein the context switching event is a pseudo-context switch performing the determination of coverage information and resuming execution of the software process without switching to a second software process.

11. The system of claim 9 wherein the context information associated with the software process includes one or more state values of one or more registers, the one or more registers including one of more of: a program counter, a stack pointer, condition codes, general purpose registers, floating-point registers, address registers, status registers, and memory management information.

12. The system of claim 9 further comprising:
parameters accessible to the OS, including inter-process state data, wherein the parameters are associated with the context information to determine the coverage information.

13. The system of claim 9 wherein the software process is an executable instance of an application program, and performance of the determining and storing of the coverage information is configurable.

14. A computer program product comprising:
a tangible storage medium readable by a processing unit and storing instructions for execution by the processing unit for implementing a method, the method comprising:
reading context information associated with a software process in response to a context switching event in an operating system (OS), the OS initiating the reading of the context information and controlling scheduling of the software process, wherein the software process is an executable instance of an application program;
determining, using the context information, coverage information for code implementing the software process in response to the OS reading the context information; and
storing the coverage information as coverage data.

15. The computer program product of claim 14 wherein the context switching event is a pseudo-context switch performing the determination of coverage information and resuming execution of the software process without switching to a second software process.

16. The computer program product of claim 14 wherein the context information associated with the software process includes one or more state values of one or more registers, the one or more registers including one of more of: a program counter, a stack pointer, condition codes, general purpose registers, floating-point registers, address registers, status registers, and memory management information.

17. The computer program product of claim 14 further comprising:
checking parameters accessible to the OS, including inter-process state data; and
associating the parameters with the context information to determine the coverage information.

18. The computer program product of claim 14 further comprising:
performing a coverage task in the OS, comprising:
reading parameters to establish one or more threshold limits to perform a coverage task in the OS;
comparing the context information against the one or more threshold limits; and
storing a result of the comparing to the coverage data.

19. The computer program product of claim 14 further comprising:
pausing execution of the software process in response to a scheduling event received at scheduling logic of the OS;
storing the context information associated with the software process in response to the context switching event;
triggering the context switching event in response to pausing the execution of the software process;
restoring previously stored context information associated with a second software process; and
resuming execution of the second software process subsequent to storing the coverage information.

20. The computer program product of claim 14 wherein performance of the determining and storing of the coverage information is configurable.

* * * * *